Patented Aug. 8, 1933

1,921,091

UNITED STATES PATENT OFFICE 1,921,091

TELLURIUM DITHIOCARBAMATES AND METHOD OF MAKING THE SAME

Paul I. Murrill, East Norwalk, Conn., assignor to R. T. Vanderbilt Company, Incorporated, New York, N. Y., a Corporation of New York No Drawing. Application April 1, 1930
Serial No. 440,860

10 Claims. (Cl. 260—11)

This invention relates to new tellurium dithiocarbamates and to methods of making the same.

The new tellurium compounds of the present invention contain the group —CSS— and are valuable vulcanizing agents and accelerators of vulcanization. The new compounds include tellurium compounds of dithiocarbamic acids of the general formula $(RR'NCSS)_4Te$ where R and R' are simple or substituted hydrocarbon radicals, such as methyl, ethyl, benzyl, etc., or in which RR'N represents piperidyl, etc., these compounds being organic tellurium compounds containing nitrogen. The invention also includes organic tellurium compounds in which carbon is joined to the —CSS— radical of the general formula $\equiv(C-CSS)_4Te$.

The new organic tellurium compounds containing nitrogen are obtainable, for example, by the mixing of a soluble salt of a dithiocarbamic acid with a soluble tellurite and thereafter adding an acid. The production of these compounds will be further described in the following more detailed description.

The sodium salt of diethyldithiocarbamic acid may be first produced as follows, the parts being by weight:

292 parts of diethylamine (4 mols) are diluted with about 3500 parts of water, and 160 parts of caustic soda (4 mols) added and dissolved while cooling to about 25° C. to prevent loss of amine. 304 parts of carbon bisulfide (4 mols) are then added gradually with continued cooling and with stirring until dissolved. The final volume should conveniently be about 4000 parts which will contain about 683 parts (4 mols) of sodium diethyl dithiocarbamate $Et_2NCSSNa$.

The sodium tellurite solution is prepared conveniently by first dissolving 80 parts (2 mols) of caustic soda in 320 parts of water, and then adding 168 parts of 95% tellurium dioxide and dissolving the same with the aid of heat and stirring. The solution is then allowed to stand and settle until clear, or may be filtered to remove insoluble matter. The solution containing 221.5 parts (1 mol) of sodium tellurite is then added to a solution of 683 parts (4 mols) of sodium diethyldithiocarbamate, both being well-cooled by the addition of ice. Dilute hydrochloric acid, in concentration of from 5% to 10% and containing 219 parts of anhydrous HCl (6 mols) is then added slowly, keeping the mixture well-stirred and cooled by further additions of ice. As the orange-yellow precipitate which forms is very bulky, further addition of water is desirable to bring the final volume of the batch to about 14 liters for each kilogram of yield expected, in order to permit efficient agitation and washing of the final product. A yield of about 96% of theoretical may be obtained. The product is filtered off and washed and dried in the usual way. The melting point of the unpurified product prepared as above is 121–122° C. After crystallizing from suitable solvents, such as alcohol or benzol, it melts at 123–124°. Ordinarily, the product is of sufficient purity to be used in the treatment of rubber without further purification.

The mother liquor obtained at the end of the reaction is neutral or nearly so, and the reaction is believed to take place in accordance with the following equation:

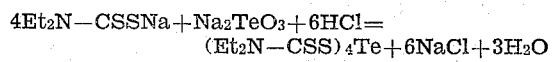

$$4Et_2N-CSSNa+Na_2TeO_3+6HCl=\\(Et_2N-CSS)_4Te+6NaCl+3H_2O$$

Other non-oxidizing acids, such as sulfuric or acetic may be used in place of hydrochloric acid without departing from the essentials of the method.

In place of the diethyldithiocarbamate as above described, a soluble salt of dimethyldithiocarbamic, dibenzyldithiocarbamic, dithiofuroic, dithiobenzoic, or other acid containing the CSSH group united to either N or C, may be used to prepare the corresponding tellurium salt.

The reaction between tellurous acid, or the soluble tellurites with a soluble salt of a dithio acid and a mineral or organic acid appears to be a general one for various salts of the thio acids containing the —CSSH group attached to nitrogen or carbon. Some of the products, however, are less stable than others and require more careful handling than in the case of the dithiocarbamates.

The new organic tellurium compounds, as will be seen, are characterized by containing the —CSS— group, and more particularly, by possessing the general formula $Te(SSC-)_4$.

While I have referred to certain of the new organic tellurium compounds, etc., as tellurium dialkyl dithiocarbamates, these new organic tellurium compounds are not metallic salts of the dialkyl dithiocarbamic acids and are distinguished from the metallic salts of such acids. Tellurium itself is not a metal and differs from the metals in its properties and reactions. It is itself a vulcanizing agent and somewhat analogous to sulfur in its properties. Furthermore, the metallic salts of the dithio acids, while they are accelerators of vulcanization, are not vulcanizing agents, whereas the new organic tellurium compounds of the present invention are themselves valuable vulcanizing agents, as well as accelerators of vulcanization. They appear to give up both sulfur and tellurium during the vulcanization of rubber therewith. The new compounds are also valuable accelerators of vulcanization when used with additional sulfur. When used without additional sulfur they can be used, e. g. to the extent of 2 to 3% by weight of the rubber. When used as accelerators of vulcanization agents, with additional sulfur, e. g. with 4% on the rubber, they may be used for example to the extent of 1/8 to 1/4% by weight of the rubber.

It will thus be seen that the invention provides new organic tellurium compounds of the general character and composition above described, as well as a new process of producing these compounds. For example, in the case of the tellurium dithiocarbamates, the sodium salt of the dialkyldithiocarbamic acid may be caused to react with tellurous acid or a soluble tellurite such as sodium tellurite, and with an acid such as hydrochloric acid in the proportions above described. The invention includes the new products as well as the new process of producing them.

I claim:

1. Organic tellurium compounds having the following general formula: $(RR'NCSS)_4Te$, where $RR'N$ stands for a dialkylamino group, a diaralkylamino group or the piperidyl group.
2. A tellurium dialkyl dithiocarbamate.
3. Tellurium diethyl dithiocarbamate.
4. Tellurium dimethyl dithiocarbamate.
5. Tellurium pentamethylene dithiocarbamate.
6. The method of producing organic tellurium compounds containing the —CSS— group, which comprises mixing a soluble alkali metal salt of an acid of the group consisting of dialkyl-dithiocarbamic acid, diaralkyl-dithiocarbamic acid and pentamethylene dithio-carbamic acid with a soluble tellurite and thereafter adding an acid.
7. In the production of organic tellurium compounds having the general formula $(X—CSS)_4Te$ where X represents a dialkylamino group, a diaralkylamino group or the piperidyl group, the step which comprises causing the tellurous acid radical to react with a soluble alkali metal salt of an acid of the group consisting of dialkyl-dithiocarbamic acid, diaralkyl-dithio-carbamic acid and pentamethylene dithio-carbamic acid.
8. The method of producing tellurium dialkyl-dithiocarbamates which comprises causing the tellurous acid radical and an acid to react with a soluble salt of a dialkyl-dithiocarbamate.
9. The method of producing tellurium dialkyl-dithiocarbamates which comprises causing sodium tellurite and an acid to react with sodium diethyl-dithiocarbamate.
10. The method of producing tellurium dialkyl-dithiocarbamates which comprises causing one mol of sodium tellurite and 6 mols of acid to react with 4 mols of sodium dialkyl-dithiocarbamate with cooling of the reaction mixture during the reaction.

PAUL I. MURRILL.